3,576,913
BLOCK COPOLYMER ELASTIC BANDS AND PROCESS FOR THE PREPARATION OF SAME

Donald W. Johnson, Redondo Beach, and Eugene T. Bishop, Moraga, Calif., assignors to Shell Oil Company, New York, N.Y.
No Drawing. Continuation-in-part of abandoned application Ser. No. 463,925, June 14, 1965. This application June 23, 1969, Ser. No. 835,813
Int. Cl. C08f 15/04; B29c 17/00, 17/14
U.S. Cl. 260—880      5 Claims

ABSTRACT OF THE DISCLOSURE

As an article of manufacture, a novel elastic band made of a block copolymer having the general configuration A—B—A wherein each A is a vinyl arene block of from 8,000 to 25,000 molecular weight, B is a conjugated diene block of from 40,000 to 150,000 molecular weight and wherein the blocks A comprise between about 20 and 40% by weight of the total block copolymer. The block copolymer may be hydrogenated. A novel continuous process is provided for the manufacture of such elastic bands.

---

The present application is a continuation-in-part of U.S. application Ser. No. 463,925 filed June 14, 1965, now abandoned.

This invention relates to rubber bands and rubber band stocks. More particularly, it relates to the use of certain block copolymers as the major elastic component in rubber bands.

A large number of elastic materials have been utilized in the past for the preparation of elastic bands. Since most of the synthetic rubbers have been found to be unsatisfactory in one respect or another for this specialized purpose, the market is largely satisfied by the use of high grade natural rubber or synthetic polyisoprene.

The preparation of rubber bands from conjugated diene elastomers such as natural rubber or polyisoprene as well as from other ordinary conjugated diene elastomers requires an intricate and carefully balanced series of manufacturing steps. Especially when employing natural rubber, it is necessary to masticate the elastomer in order to break down its natural structure to a predetermined extent, after which compounding ingredients, including particularly vulcanizing agents and accelerators as well as any desired fillers or coloring agents, are added and mixed (such as by milling) to obtain an extrudable and vulcanizable rubber band compound stock. This is then extruded through a die to form tubing.

The industry has settled upon the routine of chopping the tubing so formed into standard lengths, normally about ten feet, and suspending these on horizontally positioned mandrels, after which they are passed into a vulcanizing chamber for a time and temperature sufficient to effect vulcanization. During the stage in the process, it has been found that without special precautions a certain amount of flow occurs so that the suspended tubing becomes thicker at the bottom of the tubing than is at the top. Thus, the tubing walls can be described as being non-uniform in thickness and only as strong as the weakest part thereof. Following the vulcanizing, the tubing is then passed to a chopper which slices the rubber bands from the tubing. These may be then coated if necessary with the superficial amount of talc or other powder material to prevent the bands from sticking together and to facilitate handling.

While these bands are satisfactory for many purposes, they inherently possess a number of limitations which it would be highly desirable to improve. The process for their preparation is complicated and unduly expensive, since it requires a substantial amount of labor involved in the mastication, mixing, extrusion, tube vulcanization, and chopping. Also, the materials otherwise satisfactory have been found to have only limited elongation. Thus, it is common experience when stretching a band to encircle it about some article to find it snapping apart due to catastrophic fracture. Moreover, these rubber bands, necessarily contain vulcanizing agents which ordinarily are sulfur compounds, show the inherent disadvantage of discoloring metal such as found in novelty jewelry. Bands are often utilized for the purpose of attaching novelty jewelry to display cards and discoloration is a matter of widespread dissatisfaction in this respect.

Recent improvements in the art of polymerization have enabled the production of certain block copolymers, more fully defined hereinafter, which have the unique property of being "self-vulcanizing" in that they attain excellent stress-strain properties when properly handled without the necessity for vulcanization. They may, of course, be subjected to the usual vulcanizing procedures, but for most purposes where solvent resistance is not a factor vulcanization is found to be unnecessary. The immediate implication of this, insofar as rubber bands and rubber band manufacture are concerned, will become evident during the following detailed description of the invention.

Thus, the present invention is directed towards a new article of manufacture comprising an elastic band having uniform wall thickness and which is cylindrically shaped when unstretched, consisting of an unvulcanized block polymer having the general configuration

A—B—A wherein each A is a vinyl arene polymer block and B is a conjugated diene polymer block. For this particular purpose, e.g., the preparation of the elastic bands and tubing, it has been especially preferred to utilize block copolymers of this description wherein each A has an average molecular weight between about 8,000 and about 25,000, B has an average molecular weight between about 40,000 and about 150,000 and the blocks A together comprise between about 20 and about 40 wt. percent of the total block copolymers.

Still in accordance with the present invention, a process is provided for the preparation of the subject elastic bands which comprises continuously extruding an elastic band stock as tubing and continuously chopping the unvulcanized tubing into elastic bands, the stock comprising a block copolymer just described. It will be understood that the block copolymer may be that as described above or a hydrogenated derivative thereof or mixtures of non-hydrogenated and hydrogenated block copolymers.

The properties of the described class of block copolymers which render them particularly suitable for use in preparation of elastic bands include the following:

(1) The block copolymers do not require prior milling or vulcanization, thus, simplifying the process of their manufacture.

(2) The block copolymers exhibit increased modulus in the direction of extrusion.

(3) Thus, in turn, results in greater ease of elongation of the eleastic band in the desired direction, e.g., end-to-end of the band, than at right angles thereto.

(4) Due to the lack of need for sulfur-containing vulcanization components, the bands made from the subject block copolymers do not discolor metals in contact therewith.

(5) The block copolymers are colorless and transparent, but can be formulated with dyes, pigments, fillers, and extenders, thus providing a wide range of properties and colors.

(6) The block copolymers, in addition to the above features, have the ability to be stretched rapidly without breaking.

(7) They exhibit substantially greater elongation than natural rubber normally employed for the manufacture of bands.

Accordingly, this invention relates especially to elastic bands comprising as the principal elastomer component a block copolymer of the general configuration described hereinabove, as well as the hydrogenation derivatives thereof wherein from 50 to 100% of the double bonds of at least the conjugated diene polymer block are reduced by hydrogenation. Where, in the specification and claims, reference is made to average molecular weights, this is understood to refer to methods by which average molecular weights are determined preferably by intrinsic viscosity measurements as they are related graphically to osmotic molecular weights. These are closely coordinated with molecular weights obtained by analysis of end group-tritiated samples of the polymer, the samples being withdrawn and treated with tritiated methanal at any given stage in the process are desired. For example, the molecular weights of the polyvinyl arene blocks may be determined by withdrawal of a sample at the end of the step in the process in copolymerization forming the first polyvinyl arene block, the lithium terminated polymer block being treated at this time with tritiated methanol, whereby the lithium radical is replaced with tritium, and thereafter counting the tritium preferably in a scintillation counter.

The average molecular weights of the block copolymers found to form elastic bands of outstanding properties desired for this end use are governed not only by the inherent properties relative to elasticity and modulus but also by the fact that if too high a polyvinyl arene content is present the polymers tend to draw and have excessive set upon stretching. On the other hand, if the molecular weights of the end blocks are too low, e.g., below the limits specified, the resulting block copolymers do now have satisfactory self-vulcanizing properties. The ranges of molecular weight for the center conjugated diene polymer blocks are governed by the elasticity requirements demanded by federal specifications and commercial buyers of elastic bands.

The block copolymers may be prepared by a number of alternative processes usually involving the utilization of a living polymer. For example, the preferred type of catalyst is a lithium alkyl or lithium aryl catalyst. When a lithium alkyl is employed, the preferred process involves forming an initial polymer block of a vinyl arene such as styrene. When the desired molecular weight has been achieved, a conjugated diene such as isoprene or butadiene is injected into the polymerization vessel without altering the growing chain end which is terminated by a lithium radical. The conjugated diene adds directly to the living polymer to form an intermediate block copolymer having a living terminal such as the lithium radical. Two alternative processes may be employed for completing the formation of the basic block copolymer A—B—A. In the preferred instance, the conjugated diene polymer block is formed only to about half of its ultimately desired molecular weight. At this point a coupling agent such as a dihaloalkane is injected into the system and the resulting end product is thereby formed. It will be understood in this instance that the polymer block B contains in its center a residue of the coupling agent which for the present purposes may be ignored.

Alternatively, the intermediate block copolymer may be formed to such an extent that the conjugated diene polymer block attains its ultimately desired molecular weight, after which a vinyl arene is again introduced into the system and polymerization continued until the completed A—B—A block copolymer is formed.

Alternatively, di-initiators such as dilithionaphthalene may be employed for the formation of the block copolymers. In this instance, the polymerization of the conjugated diene is effected to form an initial polymer block thereof terminated at both ends with lithium radicals. Thereafter, a vinyl arene such as styrene is injected into the system and block copolymerization occurs on both ends of the living polymer. For many purposes, however, this latter type of process is considered to be less desirable in view of the fact that it is usually necessary to conduct the polymerization in the presence of certain polar compounds such as ethers, sulfides, secondary amines, and the like which result in a relatively low cis 1,4-structure in the conjugated diene polymer block. This in turn results in certain physical property relationships of the completed block copolymer which are not as desirable as if the conjugated diene polymer block has a cis 1,4-content of at least about 80% such as is formed when a monovalent lithium catalyst such as a lithium alkyl is employed.

Hydrogenation of the resulting products may be readily effected by the use of such catalysts as kieselguhr but much more highly effective catalysts for this purpose comprised reaction products of an aluminum alkyl compound with a polyvalent metal salt or ester. Most preferred are nickel or cobalt halides combined with an aluminum alkyl or aluminum alkyl halide. The hydrogenation may be readily performed upon the cement resulting from the solution polymerization in which the original unsaturation block copolymer is obtained.

Prior to hydrogenation, preferred species of block copolymers include the following:

polystyrene-polyisoprene-polystyrene
polystyrene-polybutadiene-polystyrene
poly(vinyltoluene)-polyisoprene-polystyrene
poly(vinylxylene)-polybutadiene-poly(vinylxylene)

The processability of the subject block copolymers may be adjusted by the use of extending oils, resins, and low molecular weight polymers as long as they are reasonably compatible with the block copolymers. Naphthenic oils extend or swell the elastomeric network while resins (polystyrene) extends the polystyrene domains. It is important that the polystyrene domains be extended with materials that are hard and resinous at rooom temperature and the network extended with soft flexible molecules. Materials compatible with one phase or the other are useful, but not with both. Highly aromatic oils, e.g., extend the network but are sufficiently soluble in the domains to weaken them.

Compatibility presents a number of problems, since it will depend upon the ratio of the polyvinyl arene blocks to conjugated diene blocks and upon the species from which the individual blocks are prepared. It has been found, however, the highly effective low molecular weight polymers which promote both extrudability and improved tensile strength comprise polymers of poly(vinylarenes) having average molecular weights between about 500 and 7,500, preferably between about 1,000 and 6,000. Typical species of such materials include polystyrene, poly(alpha-methyl-styrene), poly(vinyl toluene) and copolymers as well as mixtures of the homopolymers and copolymers of vinyl arenes, as long as the average molecular weights are within the range specified. The molecular weight of the additives may be within narrow ranges or, more preferably, are spread over a reasonably broad range as long as average is within the specified limits.

These polymers are employed in proportions from about 2.5 to 75 parts by weight per 100 parts (phr.) of the block copolymer. They may be employed as the sole additive or in conjunction with either aromatic or naphthenic rubber extender oils preferably of petroleum origin, which may be utilized in proportion between about 2.5 and 75 phr. A suitable band composition will be found especially in the following compositions:

|  | Parts by weight |
|---|---|
| Block copolymer | 100 |
| Extending oil | 5–35 |
| Low molecular weight polyvinyl arene polymer | 5–30 |

The proportion of oil and low molecular weight polymer will be adjusted to provide suitable processability through an extrusion die without undue decomposition Passed into water bath for cooling—then into chopper.

TABLE I.—COMPARATIVE DATA SHOWING EFFECT OF ORIENTATION DURING EXTRUSION ON PHYSICAL PROPERTIES OF TUBING

|  | 300% modulus, p.s.i. | 500% modulus, p.s.i. | Tensile strength at break, p.s.i. | Elongation at break, percent |
|---|---|---|---|---|
| 1. Sample prepared by milling and compression molding | 300 | 500 | 2,950 | 1,150 |
| 2. Same material as 1 after extrusion of tubing—measured in direction of extrusion | 300 | 500 | 3,000 | 1,200 |
| 3. Same material as 1 after extrusion of tubing—measured perpendicular to direction of extrusion | 150 | 250 | 2,950 | 1,100 | and at the same time to provide the ultimate rubber band having the desired set of physical properties. If hydrogenated block copolymers are employed, the low molecular weight polymer may be a hydrogenated derivative of the low molecular weight polyvinyl arenes as long as the degree of hydrogenation is at least about 50% based on the original unsaturation. In addition to the extending oils and low molecular weight polymers, the band compounds may be modified with suitable dyes, pigments, and fillers, which may be reinforcing fillers (e.g., carbon black) or non reinforcing fillers, e.g., whiting. Combinations of a white filler such as whiting with dyes or pigments of various colors provide tinted rubber bands especially desirable for novelty purposes such as attaching novelty jewelry to display cards and the like. The incorporation of antioxidant and antiozonates is especially to be desired if the bands are to be utilized for more than temporary purposes.

Other modifications of the rubber band stocks may be made depending on the ultimate physical properties desired. For example, the block copolymers may be modified by the presence of less than an equal quantity of other polymers which do not demand vulcanization such as crystal grade polystyrene, polyethylene, polypropylene, petroleum waxes, asphalt, and other suitable compounding ingredients for specified physical properties. The block copolymers have been found to have an especially desirable set of electrical properties.

One of the striking differences between conventional rubber bands and elastic bands made from the subject block copolymers is the uniform wall thickness and cylindrical shape which may be obtained by the process claimed herewith. It is unnecessary to vulcanize the compositions and therefore the nonuniform thicknesses found in conventional rubber bands due to flow while hanging on mandrels is eliminated. Therefore, the elastic band tubes extruded for chopping into elastic bands have a uniform wall thickness and a uniform set of physical properties at all points in the band circumference. One of the striking features comprises the finding that the subject block copolymers orient in the direction of extrusion and have a higher modulus in a plane parallel to the direction of extrusion while at the same time a high degree of flexibility and elongation are experienced in a direction at right angles to the extrusion. Consequently, the bands have been found to be especially desirable in physical properties based upon these several aspects.

The following example illustrates the present invention: A block copolymer was prepared having the general structure polystyrene-polybutadiene-polystyrene, the block molecular weights being 14,000–56,000–14,000. This was compounded to form the composition:

| | Parts by weight |
|---|---|
| Block polymer | 100 |
| Poly (alpha-methyl styrene), 30,000 mol wt. | 10 |
| Naphthenic mineral oil | 30 |

This composition was extruded and tested; the results of the tests are tabulated in Table I below.

Extrusion conditions

Plastics type extruder:
  L/D ration at least 10/1 __. Low compression screw.
  Barrel temp. 250°–400° F.
  Die temp. 300° –450° F. __ Heated mandrel.

For comparison purposes, a number of commercial rubber bands were tested for modulus, tensile strength and elongation at break as in run 3 in Table I. The results are tabulated in Table II.

TABLE II.—PROPERTIES OF COMMERCIAL BANDS (PROCESS OF RUN (3), TABLE 1)

|  | 300% modulus | 500% modulus | Tensile strength at break, p.s.i. | Elongation at break, percent |
|---|---|---|---|---|
| 1. "ISO-Ty" | 180 | 300 | 2,450 | 930 |
| 2. "Craftmaster" | 160 | 270 | 2,300 | 420 |
| 3. "Newscraft" | 180 | 280 | 1,900 | 950 |
| 4. "Newscarrier" | 550 | 1,500 | 2,950 | 640 |

While all of the commercial bands have a modulus greater than the subject elastic bands, none of them have the combination of superior tensile strength at break and superior elongation at break properties of the subject eleastic bands, which properties determine the strength of the band in its stretched shape and how far it will stretch before breaking, respectively.

We claim as our invention:

1. A new article of manufacture which comprises an elastic band having uniform wall thickness and which is cylindrically shaped when unstretched, consisting of an unvulcanized block copolymer taken from the group consisting of (1) a copolymer having the general configuration

A—B—A wherein each A is a vinyl arene polymer block having an average molecular weight between about 8,000 and about 25,000 and B is a conjugated diene polymer block having an average molecular weight between about 40,000 and about 150,000, the blocks A comprising between about 20 and about 40 wt. percent of the total block copolymer, (2) hydrogenated derivatives of the same wherein at least 50% of the double bonds of the block B have been reduced by hydrogenation and (3) mixtures thereof.

2. A new article of manufacture which comprises a colorless, transparent elastic band having uniform wall thickness and which is cylindrically shaped when unstretched, consisting of an unvulcanized block copolymer having the general configuration

A—B—A wherein each A is a vinyl arene polymer block having an average molecular weight between about 8,000 and about 25,000 and B is a conjugated diene polymer block having an average molecular weight between about 40,000 and about 150,000, the block A comprising between about 20 and about 40 wt. percent of the total block copolymer.

3. A composition as in claim 2 wherein the block copolymer has the general configuration polystyrene-polybutadiene-polystyrene.

4. A continuous process for the preparation of elastic bands having uniform wall thickness and which are cylindrically shaped when in an unstretched condition, comprising continuously extruding an elastic band stock as tubing and continuously chopping the unvulcanized tubing into bands, the stock comprising a block copolymer taken from the group consisting of (1) copolymers having the general configuration

A—B—A wherein each A is a vinyl arene polymer block having an average molecular weight between about 8,000 and about 25,000 and B is a conjugated diene polymer block having an average molecular weight between about 40,000 and about 150,000, the blocks A comprising between about 20 and about 40 wt. percent of the total block copolymer, (2) hydrogenated derivatives of the same wherein at least 50% of the double bonds of the block B have been reduced by hydrogenation and (3) mixtures thereof.

5. A process as in claim 4 wherein the block copolymer has the general configuration polystyrene-polybutadiene-polystyrene.

References Cited
UNITED STATES PATENTS

| | | | |
|---|---|---|---|
| 1,949,465 | 3/1934 | Gammeter | 264—159 |
| 3,265,765 | 8/1966 | Holden et al. | 260—876 |
| 3,333,024 | 7/1967 | Haefele et al. | 260—880 |

JAMES A. SEIDLECK, Primary Examiner

U.S. Cl. X.R.

260—33.6, 876; 264—150, 159